US012609479B2

(12) United States Patent
Söhnel et al.

(10) Patent No.: US 12,609,479 B2
(45) Date of Patent: Apr. 21, 2026

(54) CABLE PLUG CONNECTOR WITH OFFSET COUPLING REGION FOR THE PROTECTIVE CONDUCTOR

(71) Applicant: Neutrik AG, Schaan (LI)

(72) Inventors: Christian Söhnel, Göfis (AT); Nathalie Nipp, Schaan (LI)

(73) Assignee: Neutrik AG, Schaan (LI)

(*) Notice: Subject to any disclaimer, the term of this patent is extended or adjusted under 35 U.S.C. 154(b) by 371 days.

(21) Appl. No.: 18/524,440

(22) Filed: Nov. 30, 2023

(65) Prior Publication Data

US 2024/0388033 A1 Nov. 21, 2024

(30) Foreign Application Priority Data

May 16, 2023 (EP) .................................... 23173639

(51) Int. Cl.

*H01R 13/502* (2006.01)
*H01R 13/639* (2006.01)
*H01R 13/648* (2006.01)

(52) U.S. Cl.

CPC ......... *H01R 13/502* (2013.01); *H01R 13/639* (2013.01); *H01R 13/648* (2013.01)

(58) Field of Classification Search

None

See application file for complete search history.

(56) References Cited

U.S. PATENT DOCUMENTS 7,326,091 B2 * 2/2008 Nania ................ H01R 13/6271 439/681
8,007,319 B2 * 8/2011 Dang ..................... H01R 13/64 439/607.56
10,186,804 B2 1/2019 Menolotto et al.
10,826,248 B2 11/2020 Henke
11,539,155 B2 12/2022 Zucca et al.

FOREIGN PATENT DOCUMENTS

DE 20018034 U1 2/2001

* cited by examiner

*Primary Examiner* — Tho D Ta
(74) *Attorney, Agent, or Firm* — Volpe Koenig

(57) ABSTRACT

A cable plug connector having a mechanical retaining element, a latch slider, mechanical key elements, a cable insertion opening, an outer conductor contact element, a neutral conductor contact element and a protective conductor contact element. The outer conductor contact element provides an electrically conductive connection with the outer conductor in a first coupling portion, the neutral conductor contact element provides a connection with the neutral conductor in a second coupling portion, and the protective conductor contact element provides a connection with the protective conductor in an earthing coupling portion. These, connections are each provided within the respective coupling portions via respective conductor end pieces being contacted at at least one contact point and thereby fixed. The earthing coupling portion is arranged at a shorter distance from the cable insertion opening in the insertion direction of the power cable than ends of the first and second coupling portions.

10 Claims, 13 Drawing Sheets

CABLE PLUG CONNECTOR WITH OFFSET COUPLING REGION FOR THE PROTECTIVE CONDUCTOR

CROSS-REFERENCE TO RELATED APPLICATIONS

This application claims priority from European Patent Application No. 23173639.8, filed May 16, 2023, which is incorporated herein by reference as if fully set forth.

TECHNICAL FIELD

The present invention relates to a cable plug connector which is configured for establishing an accurately fitting mechanically lockable plug connection with a panel connector matched to the cable plug connector as a counterpart, and which has a cable insertion opening for inserting and fixing a power cable having a plurality of individual conductors (cores).

BACKGROUND

In electrical engineering, a power cable is generally defined as a single or multi-core composite of wires (individual conductors) sheathed with insulating materials, which serves to transmit electrical energy (current). Insulating materials are usually made of various plastics that surround the conductors and insulate them from each other. Electrical conductors (cores) are usually made of copper, more rarely also of aluminum or suitable metal alloys. Viewed three-dimensionally, the cable usually follows a cylindrical or similar geometry and may contain further sheath layers of insulating material or metallic foils or braids in the overall structure for the purpose of electromagnetic shielding or as mechanical protection.

The number of current-carrying conductors in the cable is the conductor count or core count. In multi-core cables, each individual core is always encased by its own insulator, the core insulation, while an outer sheath, the cable jacket, surrounds all the cores. In mains cables as well as in device connection cables, an outer conductor and a neutral conductor (also called a zero conductor) are used to conduct the current, while in mains cables of protection class I, a protective conductor (also called earth conductor/ground) is added. This carries earth potential and serves to prevent dangerous contact voltages at conductive housing or operating parts in the event of a fault by discharging them to earth.

For the power supply of devices such as loudspeaker/audio boxes, electrically conductive contacts (also referred to as pins, flat plug contacts, sheets, etc.) in cable plug connectors are connected to the cores of power cables as standard and these cable plug connectors connected to the power cables are then inserted into panel connectors correspondingly matched to the cable plug connectors as counterparts to create a so-called cable plug connection. The pins/sheets of the cable plug connectors, which are connected to the cores of the power cables, contact electrically conductive contacts (which are designed as counterparts to the pins/sheets) in the panel connectors when the plug connection is made, as a result of which the current can flow into the device via the pins of the cable plug connectors and via the contact counterparts of the panel connectors that are contacted with them (i.e. across the plug connection) and thus provide its power supply.

To establish the electrically conductive connection between the pins of the cable plug connector and the cores of a power cable, it is necessary to remove the insulation surrounding the respective cores at the contact region of the cores with the pins (usually the end of the respective core) (for example, by using stripping pliers or knives or side cutters intended for this purpose). The thus exposed region of the cores (also called stranded wires) is contacted with the corresponding pin, for example by crimping, soldering or welding. Another way of connecting the stripped part of the core to the pin in an electrically conductive manner is to clamp the two parts together using a terminal/clamp specially adapted to the shape of the pin.

With cable plug connections, there is always a risk that an unintentional and/or excessive pull on the power cables will lead to a failure of the cable strain relief (e.g. provided by a PG gland with axial feedthrough for the cable) and as a result the electrically conductive connection between pin and core will be interrupted. Especially in environments with high mechanical stress on the power cables, e.g. at events, on stage, etc., the cable plug connector with elements projecting away from it, such as operating elements of connection and/or locking systems, can get caught on other cables or on structures in the environment when the power cables are laid or wound up. This can lead to damage to cables, in particular power cables, or connectors, and in the worst case to the power cables being torn out of the connector housing (or to the pin and/or stranded wire being torn out of the terminal provided for contacting).

If, when the power cable is torn out of the cable plug connector, the earth conductor is torn away from the corresponding pin and/or from the corresponding terminal before the other cores, i.e. if there is a termination of contact of this earth conductor with the pin, the situation in the plug connection is such that the power supply via neutral and outer conductors is still ensured, but the protective function of the earth conductor is no longer given. This can lead to a short circuit inside the device, which can severely damage the device or even set it on fire, or which can lead to an electric shock that can catch and injure people in the vicinity of the device.

In order to reduce this potential danger, it is common practice according to the prior art to contact the stripped region of the cores with the corresponding pin in the usual way (for example by clamping in a terminal), wherein, however, the earth conductor is designed longer (has a greater overall length) than the neutral and outer conductors. In this way, in the event of a pull/tear on the power cable and thus also on the respective cores, the neutral and outer conductors are pulled out of contact with the pins before the earth conductor, as these are shorter and are thus stretched more quickly, or the tensile stress occurring due to the tear acts more quickly on the contacting than the earth conductor, for which a longer path must be covered until this core is stretched due to the greater length (which is realized, for example, in the form of a loop of the core in the cable plug connector). This ensures that the earth conductor is always the last of the wires to be torn away from the pins and that the cable plug connector thus remains permanently protected.

This preparation of the cores, i.e. leaving the earth conductor longer than the neutral and outer conductor, and the corresponding contacting of the cores, i.e. for example installing the earth conductor with a loop, must be carried out by the fitter when inserting the power cable into the cable plug connector, which means additional work and time.

SUMMARY

It is therefore an object of the invention to provide a cable plug connector that overcomes the disadvantages from the prior art, especially in light of the strict specifications with regard to safety and the globally established installation dimensions.

A further object is to provide a cable plug connector in which the risk of a short circuit, which can severely damage the device or even set it on fire, or which can lead to an electric shock that can catch and injure people in the vicinity of the device, is reduced.

These objects are achieved by the realization of one or more of the features disclosed herein. Features which further develop the invention in an alternative or advantageous manner are to be taken from the description and claims that follow.

The invention relates to a cable plug connector configured to establish an accurately fitting mechanically lockable plug connection with a panel connector matched to the cable plug connector as a counterpart, wherein the cable plug connector comprises:

- a mechanical retaining element provided to be blocked from axial movement in the cable plug connector extraction direction by a retaining element counterpart on the panel connector side as part of a first part of a locking mechanism operable by rotation of the cable plug connector in a screwing-in direction when the cable plug connector is at least partially inserted into the panel connector,
- a latch slider, which is provided in order to engage, as part of a second part of the locking mechanism, which can be actuated by displacing the latch slider, with a latch connected to the latch slider in a locking element on the panel connector side and thus to block the cable plug connector against rotation in an unscrewing direction, which is directed counter to the screwing-in direction,
- mechanical key elements which are provided to cooperate with matched key element counterparts of the panel connector in such a way that the cable plug connector can be inserted into the panel connector in only one specific rotational orientation predetermined by the key element counterparts,
- a cable insertion opening for inserting a power cable comprising three individual conductors, namely an outer conductor, neutral conductor and protective conductor, and
- an outer conductor contact element, a neutral conductor contact element and a protective conductor contact element, which are each provided to come into contact with a respective contact element counterpart on the panel connector side by the establishment of the plug connection (so that conduction of a current signal across the plug connection can be provided by the establishment of the plug connection), wherein
  - the outer conductor contact element is intended to provide an electrically conductive connection with a conductor end piece of the outer conductor in a first coupling portion,
  - the neutral conductor contact element is intended to provide an electrically conductive connection with a conductor end piece of the neutral conductor in a second coupling portion, and
  - the protective conductor contact element is intended to provide an electrically conductive connection with a conductor end piece of the protective conductor in a third coupling portion, hereinafter referred to as the earthing coupling portion,
  - wherein the electrically conductive connections are each provided within the respective coupling portion by the fact that the respective conductor end piece of the individual conductor can be contacted at at least one contact point and thereby fixed,
- wherein an end of the earthing coupling portion on the cable insertion opening side, in particular the at least one contact point with the conductor end piece of the protective conductor, is arranged at a shorter distance from the cable insertion opening in the insertion direction of the power cable into the cable insertion opening than an end of the first coupling portion on the cable insertion opening side and an end of the second coupling portion on the cable insertion opening side, in particular than the at least one contact point with the outer conductor and the at least one contact point with the neutral conductor.

In an exemplary embodiment of the cable plug connector according to the invention, the cable plug connector comprises a coupling piece, wherein the coupling piece is provided to be inserted in an axial direction into an opening of the panel connector to establish the plug connection.

In a further embodiment of the cable plug connector according to the invention, the cable insertion opening is provided to be arranged at an end of the cable plug connector opposite the coupling piece in the axial direction.

In other words, the cable plug connector has three current transfer contact elements, hereinafter also referred to as pins, wherein it is specifically assigned which of these three pins is to be contacted with the outer conductor, and which is to be contacted with the neutral conductor, and which is to be contacted with the protective conductor. In this context, the term "pin" is understood to mean not only a cylindrical current transfer contact element, but also contact elements of any shape, such as flat, platelet-shaped (in such a case, the pin is often also referred to as a sheet) or coiled, helical contacts. Furthermore, the pins are arranged within the cable plug connector in such a way that their respective part to be contacted is directed towards the cable insertion opening. This cable insertion opening is arranged opposite the side of the cable plug connector that is inserted into a panel connector by means of a coupling piece specially adapted to a panel connector.

In a further embodiment, the cable plug connector has three fixing elements, wherein the electrically conductive connections can each be provided by one of the three fixing elements, wherein the three fixing elements are each designed as a terminal, in particular as a screw terminal, in particular wherein the respective terminal has in each case an axial feedthrough, into which the respective current transfer contact element can be inserted in the axial direction of the feedthrough and the respective conductor end piece (stranded wire) of the individual conductor can be inserted from a direction opposite the axial direction of the feedthrough, and by realizing a clamping mechanism, in particular by screwing a screw into the terminal designed as a screw terminal, the respective conductor end piece of the individual conductor can be contacted at the at least one contact point with the respective current transfer contact element (pin), wherein the respective conductor end piece of the individual conductor and the respective current transfer contact element can be fixed in the terminal by realizing the clamping mechanism.

Since the parts of the pins/sheets, which are each to be electrically conductively connected to a core of a power cable inserted into the cable insertion opening of the cable plug connector, point in the direction of the cable insertion opening and thus away from the coupling piece of the cable plug connector, it is easier for the fitter to make a connection with the respective cores in a so-called coupling portion. A coupling portion is understood to be a region in which the stripped part of a core (stranded wire) is in electrically conductive contact with the uninsulated, metal part of the pin at at least one point (contact point). This contact (point) in the coupling portion can be made in any way known to a person skilled in the art, for example by using terminals specially provided for this purpose. Here, for example, both the pin and the stranded wire are inserted through openings in the terminal and pressed there with the aid of a screw (the screw presses, for example, directly onto the stranded wire and/or the pin or it presses onto a movable part inside the terminal, which thereby moves into the opening of the terminal and thus contacts and fixes the stranded wire and pin). The screw thus ensures that there is stable contact between the stranded wire and the pin and that this contact does not come loose again in the event of mechanical stress (that is to say, e.g., a slight tug on the cable), as can occur during the usual installation work of the cable plug connector.

In a further embodiment of the cable plug connector according to the invention, the mechanical retaining element is moved by and upon actuation of the first part of the locking mechanism along an inclined path of the retaining element counterpart until the retaining element encounters a rotational stop provided in the panel connector and thus a final insertion position of the cable plug connector in the panel connector is reached, and

- is formed as a lug arrangement and the retaining element counterpart is formed as a groove arrangement, wherein grooves of the groove arrangement—in the inserted state—first extend axially and thereby serve as key counterparts for the lug arrangement serving in particular as key elements, and then extend normal to the axis or slightly obliquely to normal to the axis, wherein the groove arrangement region extending normal or slightly obliquely to normal to the axis engages behind the lug arrangement as a result of the establishment of the plug connection and the cable plug connector is thereby blocked against axial extraction, or
- is formed as a groove arrangement, wherein grooves of the groove arrangement first extend axially, thereby serving in particular as key elements for key counterparts of the panel connector, and then extend normal to the axis or slightly oblique to normal to the axis, wherein the retaining element counterpart is formed as a lug arrangement which is inserted into the groove arrangement by the establishment of the plug connection and engages behind through the groove arrangement region extending normal or slightly oblique to normal to the axis, thereby blocking the cable plug connector against axial extraction.

If the cable insertion opening is provided to be arranged at an end of the cable plug connector opposite the coupling piece in the axial direction, the extent/extension of the cable insertion opening can vary within this arrangement. The term axial direction is understood to mean the direction of the longitudinal axis of the cable plug connector.

In an exemplary embodiment of the cable plug connector according to the invention, the cable insertion opening is arranged at the end of the cable plug connector opposite the coupling piece in the axial direction in such a way that the cable insertion opening runs/extends perpendicularly to the longitudinal axis. In other words, the cable insertion opening lies in a plane that extends perpendicular to the longitudinal axis (the extended longitudinal axis protrudes from and is perpendicular to this image plane). Since the cable insertion opening lies in this plane, it thus extends in this plane (center of the opening and edge of the opening both lie in the plane). Thus, in this exemplary embodiment of the cable plug connector according to the invention, the insertion direction of the power cable into the cable insertion opening runs parallel to or coaxially along the longitudinal axis. The longitudinal axis can also be designed as the central axis of the cable plug connector.

However, any other arrangement of the cable insertion opening is also feasible, for example an arrangement in which the cable insertion opening extends in a plane (in which the cable insertion opening lies in a plane) which includes the longitudinal axis of the cable plug connector. In this way, the insertion direction of the power cable into the cable plug connector is perpendicular/orthogonal to the longitudinal axis of the cable plug connector in this exemplary embodiment of the cable plug connector according to the invention.

In the cable plug connector according to the invention, the pin, or part of the pin, which is to be electrically conductively connected to the earth conductor (also referred to as the protective conductor contact element or earth pin) is positioned within the cable plug connector closer to the cable insertion opening than the outer conductor contact element (outer conductor pin) and the neutral conductor contact element (neutral conductor pin). Thus, the cable insertion opening side end of the earthing coupling portion and accordingly also the at least one contact point of the earth strand and earth pin have a smaller distance to the cable insertion opening or a larger distance to the coupling piece of the cable plug connector than the cable-insertion-opening-side end of the first coupling portion and accordingly also the at least one contact point of the outer conductor strand and outer conductor pin and the cable-insertion-opening-side end of the second coupling portion and accordingly also the at least one contact point of neutral conductor strand and neutral conductor pin.

If the cores of a power cable, which all have the same length, are now connected to the pins in the corresponding coupling portions, a loop is formed in the earth conductor quite automatically and without any further work steps due to the earthing coupling portion being closer to the cable insertion opening.

This ensures that, in the event of improper pulling/tearing on the power cable and/or on the cable plug connector, the electrically conductive connection of the stripped part of the earth conductor to the earth pin in the corresponding earthing coupling portion is the last to come loose, i.e. after the connections of the neutral and outer conductors to the corresponding pins, although the respective cores of the power cable all have the same length and thus no further work steps occur for the fitter, such as, for example, leaving the earth conductor longer by cutting and stripping it differently from the other cores of the power cable or a complicated insertion of the earth conductor left longer into the cable plug connector by means of, for example, a loop. The disadvantages of prior art cable plug connectors described above are thus eliminated by the cable plug connector according to the invention.

Because the electrically conductive connection in the earthing coupling portion is the last to be released, i.e. after the connections of the neutral and outer conductors to the corresponding pins, the cable plug connector according to the invention remains earthed in any case until the neutral and outer conductors are already released from their respective coupling portions and thus no current can flow uncontrolled into the device. This reduces the risk of a short circuit that can severely damage the device or even set it on fire, or that can lead to an electric shock that can catch and injure people in the vicinity of the device.

In a further embodiment of the cable plug connector according to the invention, the protective conductor contact element has a greater overall length in the axial direction than the outer conductor contact element and/or the neutral conductor contact element.

In this embodiment of the cable plug connector according to the invention, the earth pin is longer than the other pins in order to position the protective conductor contact element (earth pin) within the cable plug connector closer to the cable insertion opening compared to the outer conductor pin and neutral conductor pin and thus to provide a reduced distance of the earthing coupling portion from the cable insertion opening. If the earth pin is now inserted in exactly the same way as the other pins, for example into a pin holder of a cable plug connector, it protrudes somewhat further from the pin holder due to its greater overall length and therefore has the desired reduced distance from the cable insertion opening. By using an extended ground pin to provide the reduced distance to the cable insertion opening, the respective ends of the three pins opposite the coupling portions can still be inserted the same distance into the pin holder, whereby the distance of these pin ends to the coupling piece is the same for all three pins. This has the advantage that commercially available panel connectors can still be used to provide the plug connection with this embodiment of the cable plug connector according to the invention.

In a further embodiment, a mechanical blocking element for the cable strain relief is arranged at the cable insertion opening, which is provided to block the power cable inserted into the cable insertion opening with regard to an axial movement in the cable extraction direction.

This embodiment of the invention has the advantage that the power cable inserted into the cable plug connector is not only held by the connections of the respective individual conductors (cores) with the corresponding current transfer contact elements (pins) within the cable plug connector, but is additionally fixed at least at one further point by the blocking element. The blocking element can be designed as a collet chuck, a clamping sleeve, a PG screw connection or a slider. A clamping sleeve has an axial feedthrough for the cable, wherein the clamping sleeve is pressed against the cable by screwing on a so-called union nut and thus blocks the cable with regard to an axial movement in the cable extraction direction. A slider can be designed in such a way that the slider can be moved along a rail into the cable insertion opening and can thus press on the power cable inserted through the cable insertion opening into the cable plug connector. By way of example, the cable strain relief can also be designed as a tilting element, which can be moved into the cable insertion opening via a hinge by means of mechanical actuation (e.g. pressing a finger), and can thus press on the power cable inserted through the cable insertion opening into the cable plug connector. In this way, the power cable is more stably fixed inside the cable plug connector and tearing the power cable out of the cable plug connector (and thus also tearing off the connections of the strands with the pins) is thus made more difficult.

In a further embodiment, the cable plug connector has an insulation element, wherein the insulation element is designed to spatially separate the three coupling portions from one another and to insulate them in such a way that no electrically conductive connection can exist between the coupling portions.

In a further embodiment, the insulation element has three recesses for receiving one each of the three fixing elements, in particular wherein the three recesses are spaced apart from one another in such a way that no electrically conductive connection can exist between the current transfer contact elements fixed in the respective terminal.

In a further embodiment, one of the three recesses is designed to receive the fixing element provided for fixing the protective conductor contact element, hereinafter referred to as the protective conductor contact element recess, wherein the extent of the protective conductor contact element recess in the axial direction to the cable insertion opening extends 1 mm to 5 mm, in particular 3 mm, further than the respective extent in the axial direction to the cable insertion opening of the other two recesses.

In a further embodiment, the coupling piece is intended, in interaction with a support skirt region of the panel connector in the state created by the establishment of the plug connection, to provide a support effect for the cable plug connector with respect to loading forces acting on the cable plug connector perpendicular to the cable plug connector insertion direction.

BRIEF DESCRIPTION OF THE DRAWINGS

The cable plug connector according to the invention is described in greater detail below by way of purely exemplary embodiments shown schematically in the figures. Identical elements are denoted with the same reference signs in the figures. The embodiments described are generally not shown to scale and they are not to be understood as a limitation. More specifically

DETAILED DESCRIPTION

Figure 1A:
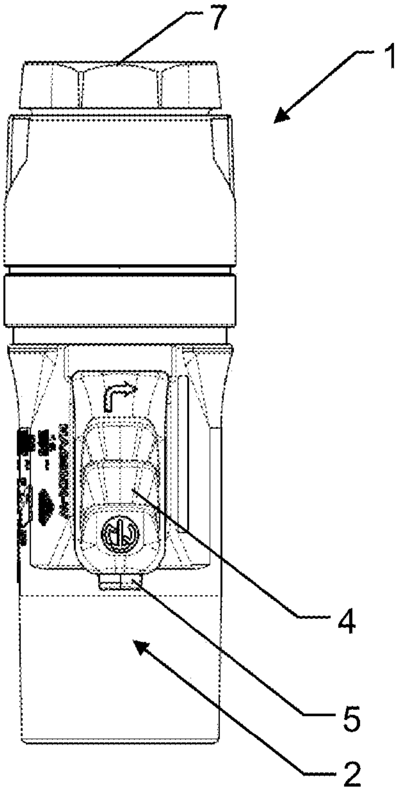
FIGS. 1A-1C: show different views of an exemplary embodiment of the cable plug connector according to the invention.
Figure 1B:
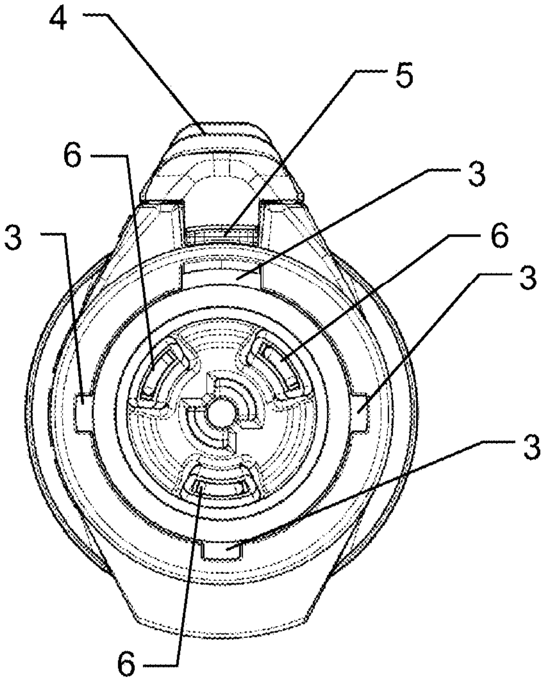
Figure 1C:
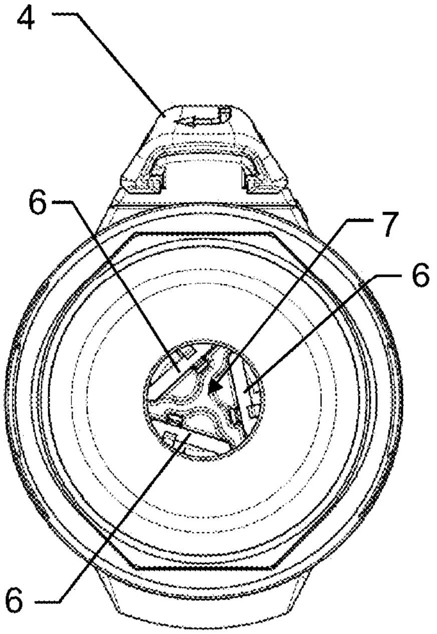

FIGS. 1A-1C show a side view of an exemplary embodiment of the cable plug connector 1 according to the invention (FIG. 1A), a top view from the perspective of a panel plate when the connector 1 is inserted into a panel connector (FIG. 1B) and a top view towards the mounting plate when the connector 1 is inserted into the panel connector (FIG. 1C).

The cable plug connector 1 has a coupling piece 2, wherein the coupling piece 2 is provided to be inserted in the axial direction (i.e. in a direction of the longitudinal axis of the cable plug connector 1) into an opening of a panel connector in order to establish the plug connection. Furthermore, FIG. 1B shows four key elements 3, here formed as grooves, which are arranged on the coupling piece 2 and are provided for cooperation with key counterparts of the panel connector formed as lugs. The cable plug connector 1 has a latch slider 4 with a latch 5 provided for engagement in a latch socket of the panel connector. By the interaction of latch 5 with the latch socket of the panel connector, the cable plug connector 1, which is inserted in the panel connector in a locked state, is blocked with regard to rotation and axial movement in the cable plug connector extraction direction. Since the cable plug connector 1 has been inserted into the panel connector in one direction of the longitudinal axis of the cable plug connector 1, an axial movement in the cable plug connector extraction direction accordingly means a movement in the opposite direction of the longitudinal axis of the cable plug connector 1.

Furthermore, the cable plug connector 1 has three current transfer contact elements (pins) 6, wherein each of the three pins 6 is provided to make contact with a respective current transfer contact element counterpart (mating pin) on the panel connector side (the ends of the pins 6 shown in FIG. 1B make contact with the mating pins) by the establishment of the plug connection, so that the establishment of the plug connection can provide a conduction of a power supply signal across the plug connection. In the shown embodiment of the cable plug connector 1, the ends of all three pins 6, which are to be contacted with the mating pins, are equidistant from the opening of the coupling piece 2.

FIG. 1C shows the cable insertion opening 7, which is designed for inserting and fixing a power cable with several individual conductors (cores). The cable insertion opening 7 is arranged at the end of the cable plug connector 1 opposite the coupling piece 2 in the axial direction. When looking through the cable insertion opening 7 into the interior of the cable plug connector, the three pins 6 can be seen, wherein these ends of the pins 6 are provided to be electrically conductively connected in a respective coupling portion with a respective core of the power cable inserted into the cable insertion opening 7.

Figure 2:
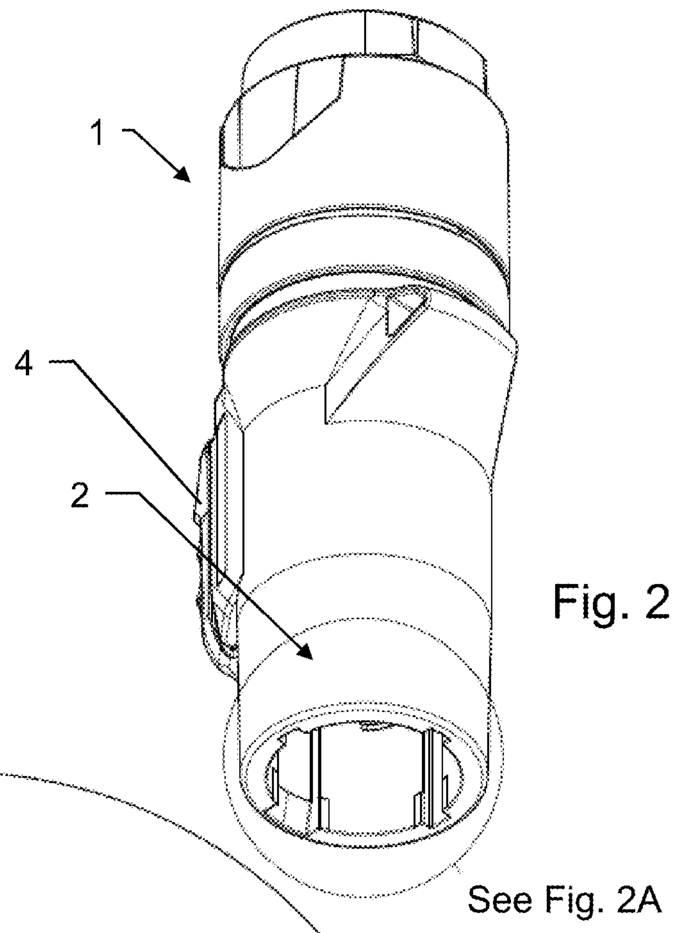
FIGS. 2-2A: shows a perspective view of the cable plug connector from FIGS. 1A-1C.
Figure 2A:
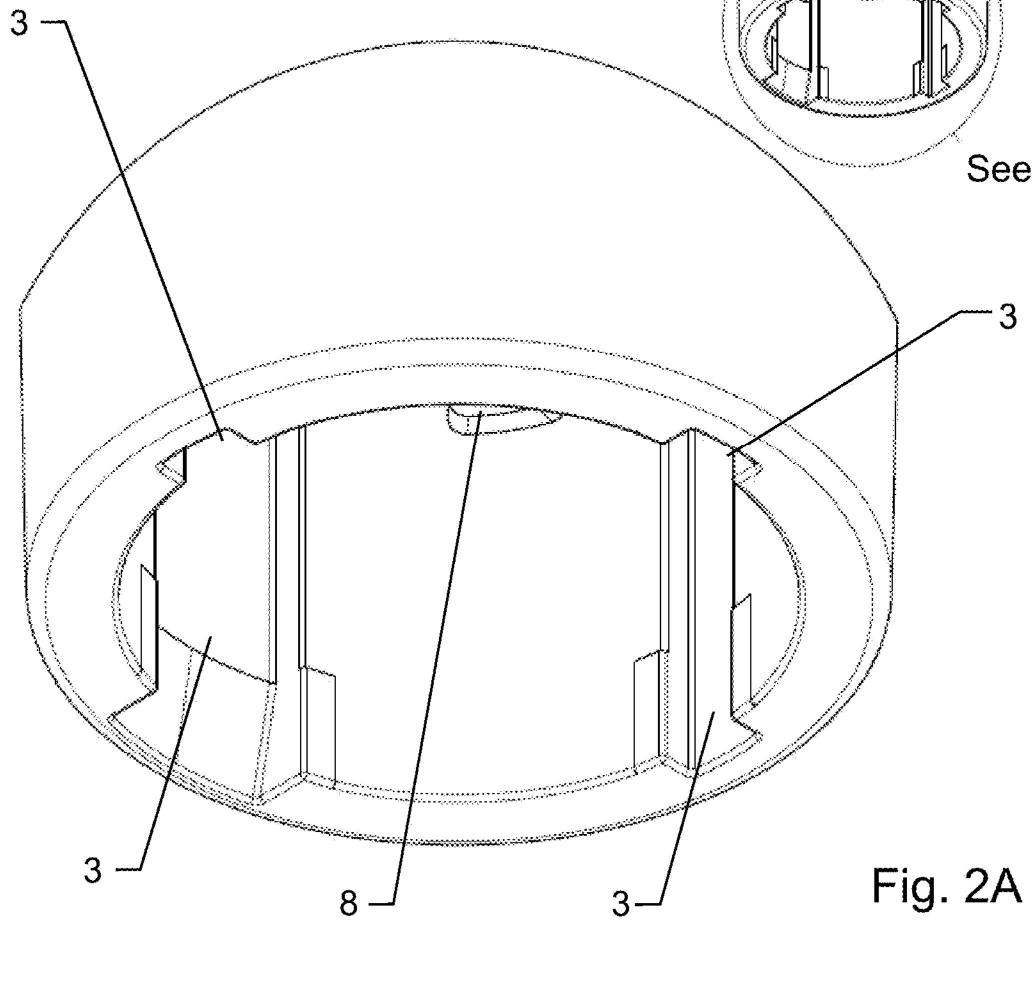

FIGS. 2 and 2A show a perspective view of the current signal input cable plug connector 1 from FIGS. 1A-1C, wherein the side intended for insertion into the panel connector (coupling piece 2) is highlighted here. In the highlighted part, for one of the grooves 3, a portion 8 running normal to the axis or slightly oblique to normal to the axis is just visible, which in a locking position engages behind a key counterpart of the panel connector designed as a nose, whereby an accidental axial extraction of the cable plug connector 1 is blocked.

Figure 3A:
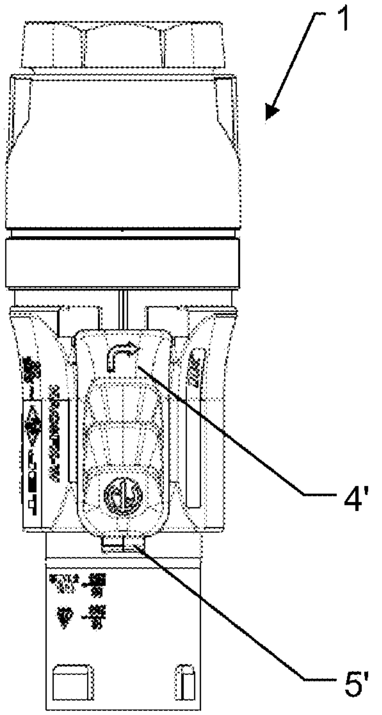
FIGS. 3A-3B: show various views of an exemplary embodiment of the cable plug connector according to the invention.
Figure 3B:
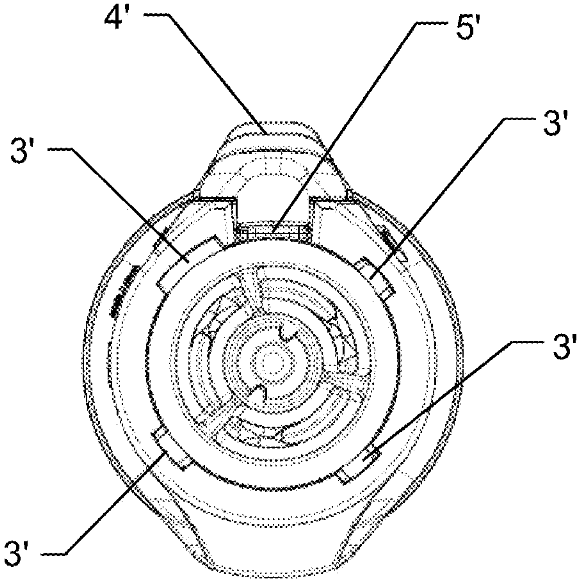

FIGS. 3A and 3B show a side view of an exemplary embodiment of the cable plug connector 1 according to the invention (FIG. 3A) and a top view from the perspective of a panel plate when the plug 1 is inserted into a panel connector (FIG. 3B).

The cable plug connector 1 has a latch slider 4' with a latch 5' provided for latching into a latch socket of the panel connector. Furthermore, four key elements 3' are visible, here designed as lugs, which are provided for interaction with key counterparts of the panel connector designed as grooves.

Figure 4:
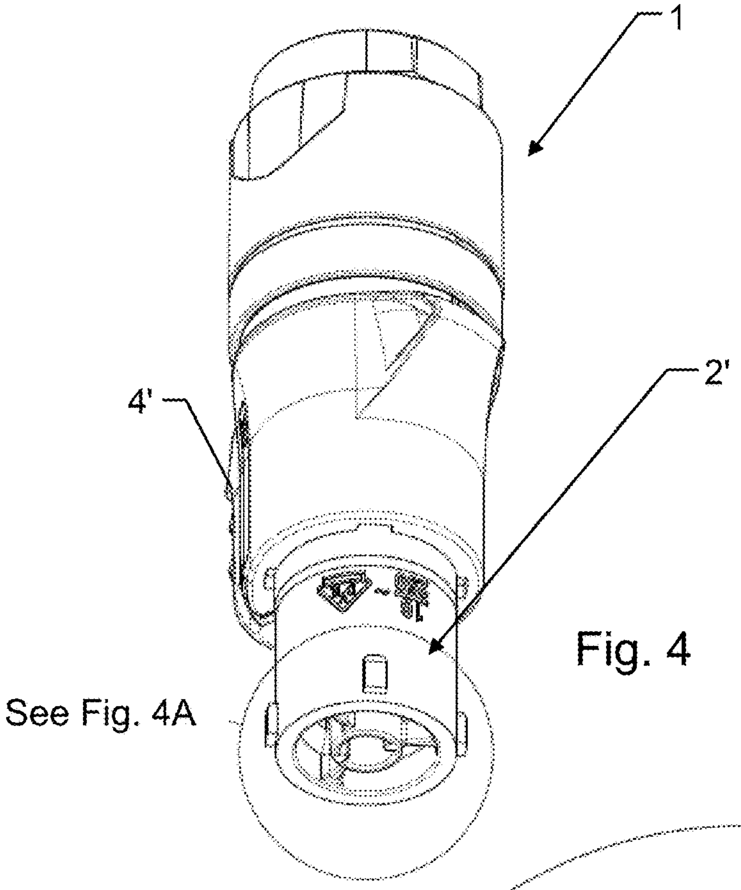
FIGS. 4-4A: shows a perspective view of the cable plug connector from FIGS. 3A-3B.
Figure 4A:
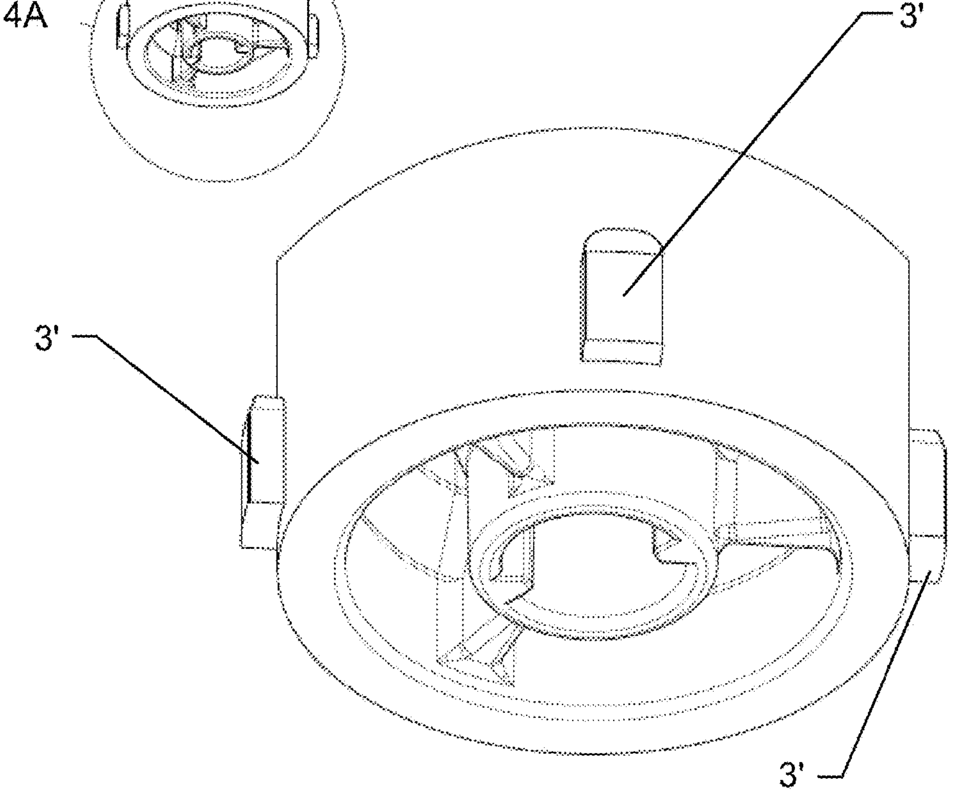

FIGS. 4 and 4A show a perspective view of the cable plug connector 1 from FIGS. 3A-3B, wherein the side intended for insertion into the panel connector (coupling piece 2) is highlighted here. The lugs serve here as key elements 3' as well as for blocking an axial extraction of the cable plug connector 1 in a completely screwed-in state, if the lugs are then located in grooves of the panel connector running perpendicular or slightly oblique to the axis.

Figure 5:
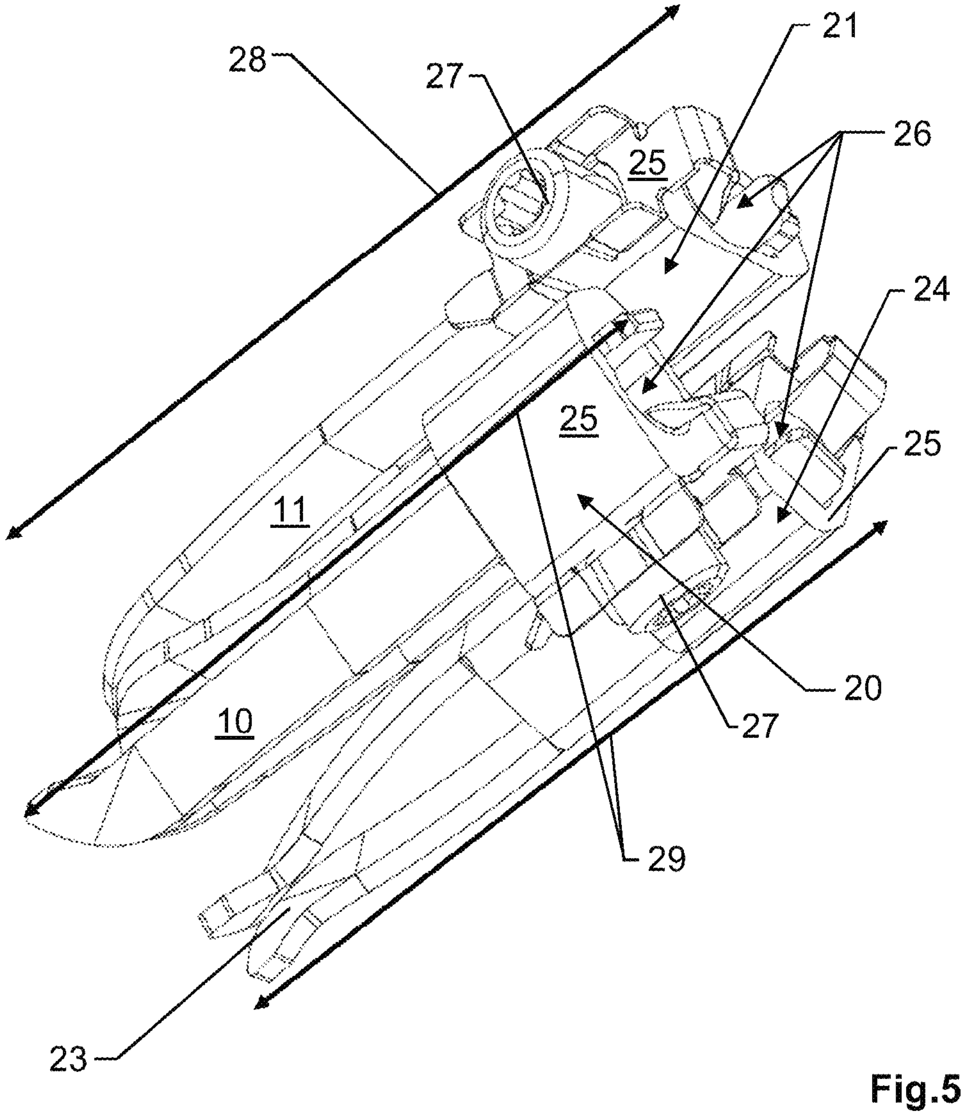
FIG. 5: shows a perspective view of an exemplary embodiment of the three current transfer contact elements (pins)

FIG. 5 shows a perspective view of an exemplary embodiment of the three current transfer contact elements 10, 11, 23 (pins) used, wherein the pins 10, 11, 23 shown are already inserted into the corresponding terminals 25 (fixing elements) for establishing the stable contact between pin and stranded wire (conductor end piece) in at least one contact point. The terminals 25 each have an axial feedthrough 26, wherein the pins 10, 11, 23 are each inserted into the feedthrough 26 from one side in the axial direction. The terminals 25 also each have a screw 27 which is provided to be screwed into the feedthrough 26 perpendicularly to the axial direction of the feedthrough 26 and thus to move a strut of the terminal 25 projecting into the feedthrough 26, which in turn moves a pin (10, 11, 23) inserted from the other side (opposite the direction of insertion of the pins 10, 11, 23) inserted into the feedthrough 26 from the other side (opposite the direction of insertion of the pins 10, 11, 23) against the inserted pin 10, 11, 23 and thus fixes both the stranded wire and the pin within the terminal/inside the cable plug connector and provides at least one electrically conductive contact point in the respective coupling portion 20, 21, 24.

The pins 10, 11, 23 shown are pins for a so-called female cable plug connector. It goes without saying that the previous explanations regarding the cable plug connector according to the invention concern both embodiments with male and female cable plug connectors and thus the design of the pins 10, 11, 23 is not limited to the embodiment shown in FIG. 5.

FIG. 5 also illustrates that the pin 11, which is provided to be electrically conductively connected to the stranded wire of the earth conductor 17 of a power cable inserted through the cable insertion opening 7 into the cable plug connector 1 in the ground coupling portion 21 (also referred to as ground pin 11), has a greater total length 28 than the respective total length 29 of the outer conductor pin 10 and the neutral conductor pin 23. The greater overall length 28 of the earth pin 11 and the correspondingly offset earthing coupling portion 21 is illustrated in FIG. 5 by the fact that the earth pin 11 or the earthing coupling portion 21 protrudes further than the other two pins 10, 23 or their coupling portions 20, 24.

Figure 6:
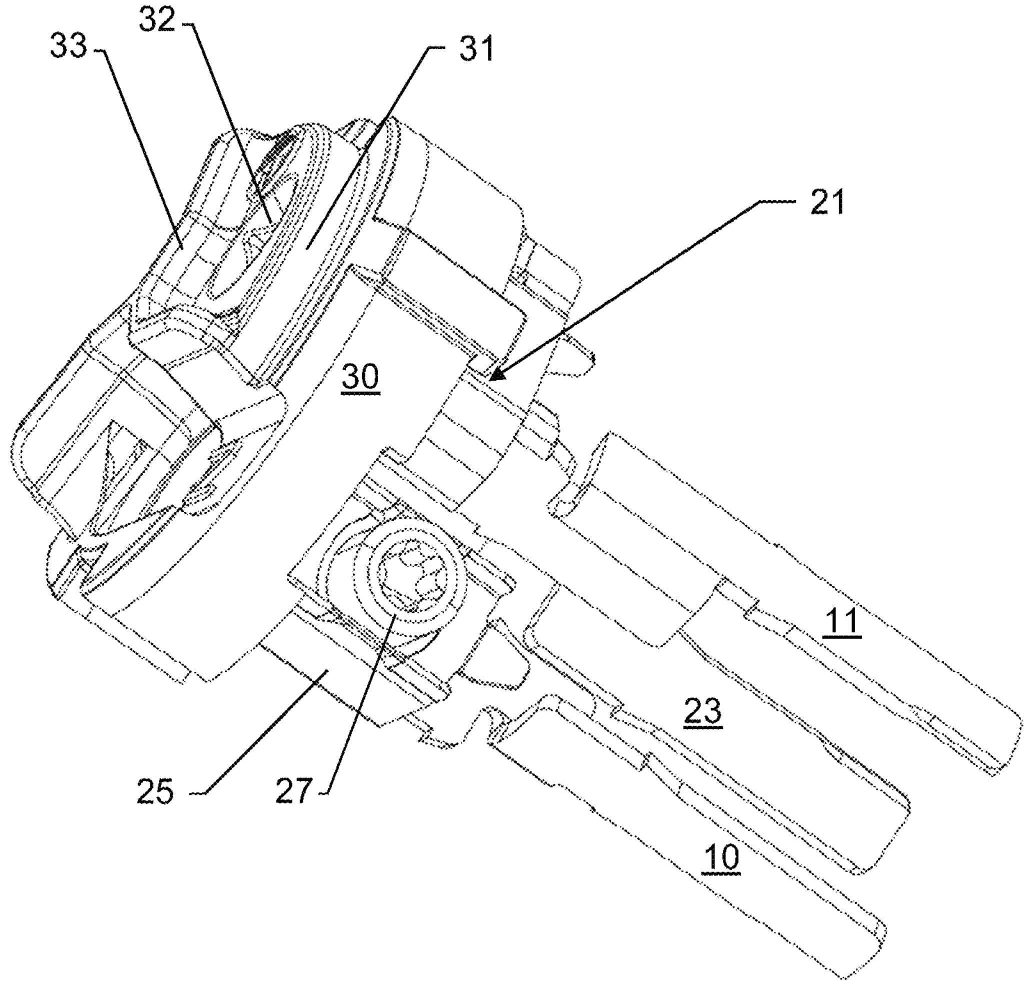
FIG. 6: shows a perspective view of an exemplary embodiment of the arrangement of insulation cover and pins.

FIG. 6 shows a perspective view of an exemplary embodiment of an insulation cover 30 (insulation element), in which the three pins 10, 11, 23 are inserted together with the respective terminal 25, wherein pins for a male cable plug connector are shown in this exemplary embodiment. The insulation cover 30 has three recesses here, in each of which a terminal 25 can be accommodated together with the inserted pin (10, 11, 23) in such a way that the arrangement of terminal and pin is held in the recess and is thus fixed with respect to movement both in the axial direction of the longitudinal axis and orthogonally to the longitudinal axis of the cable plug connector 1. The three recesses are arranged here at a distance from each other in the retaining and insulation cover 30 in such a way that the received arrangements of terminal and pin are present at a distance from each other in the cable plug connector 1. Consequently, the retaining and insulation cover 30 ensures that the three coupling portions (20, 21, 24) are spatially separated from each other and are insulated in such a way that no electrical connection can exist between the coupling portions (20, 21, 24).

The three pins 10, 11, 23 are arranged here in such a way that their ends, which are each provided to be coupled to a mating pin of a panel connector, would all be equally spaced from the coupling piece 2 or from the outer end 12 of the coupling piece 2, respectively, if the shown arrangement of insulation cover 30 and pins 10, 11, 23 were inserted into a pin holder for the cable plug connector 1 according to the invention.

Due to the greater overall length of the earth pin 11, in such an arrangement, as already shown in FIG. 5, the earth pin 11 together with the corresponding terminal 25 and thus also the earthing coupling portion 21 protrude further in the axial direction of the longitudinal axis of the pins 10, 11, 23, which is why the insulation cover 30 must be adapted accordingly to the offset earthing coupling portion 21. Such an adaptation takes place, as shown in the exemplary embodiment of FIG. 6, in that the insulation cover 30 has a deeper recess 31 on the side facing the pins for the earth pin 11 and terminal 25 or for the earthing coupling portion 21 than for the other pins 10, 23 (plus terminal 25) or their coupling portions 20, 24 (the recess 31 is designed to be 1 mm to 5 mm, in particular 3 mm, deeper than the other recesses). On the side of the insulation cover 30 facing away from the pins (i.e. the side of the cover 30 which can be seen in FIG. 6), the deeper recess 31 for the earth pin 11 is accordingly realized as an elevation 31 (consequently an elevation in the range of 1 mm to 5 mm, in particular 3 mm), wherein within this elevation 31 there is a core insertion opening 32 which is specially provided for the insertion of the earth conductor 17 or its stranded wire. Since the insulation cover 30 also has a raised three-armed lip 33 for delimiting the three core insertion openings from one another, the longitudinal extent of the arrangement of insulation cover 30 and the pins 10, 11, 23 remains unchanged despite the increase 31.

Figure 7:
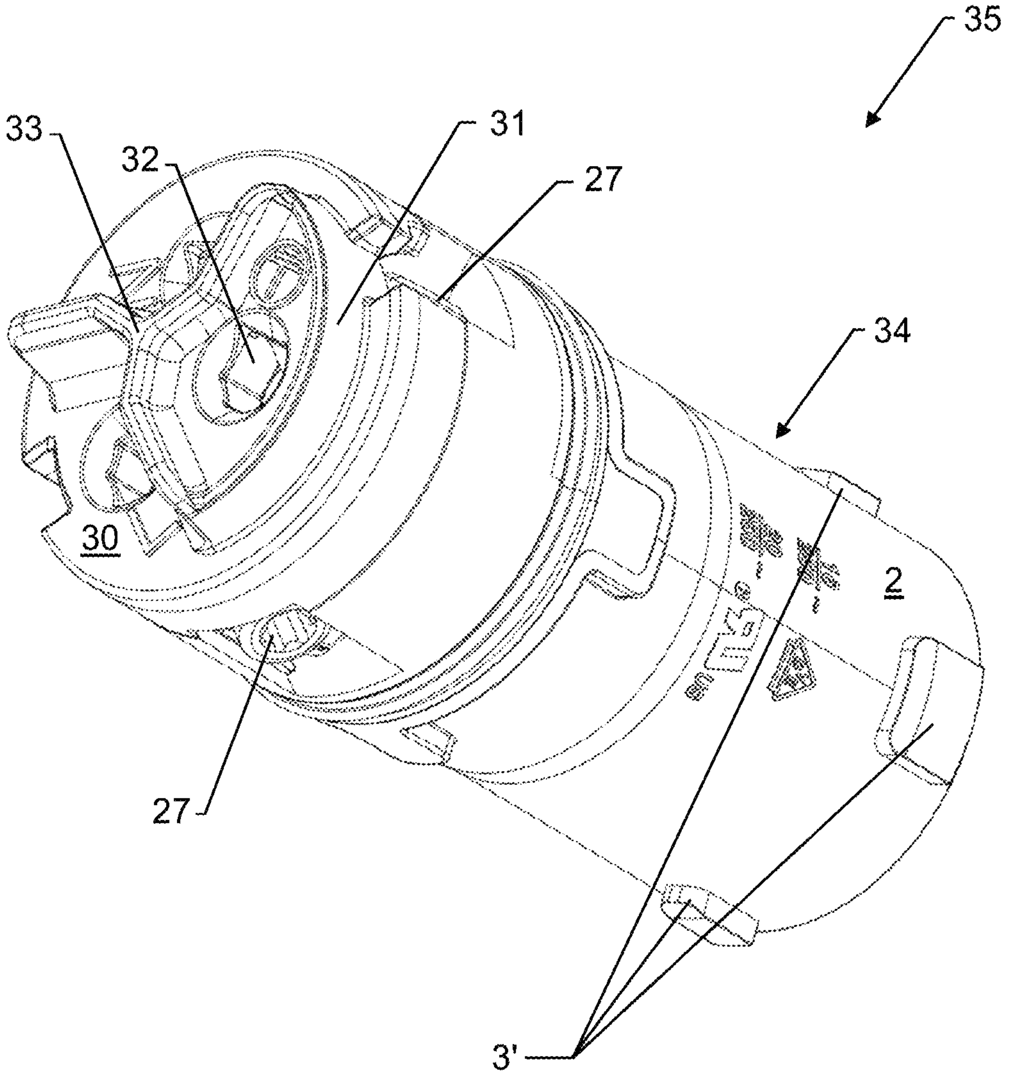
FIG. 7: shows a perspective view of an exemplary embodiment of the arrangement of insulation cover, pins and pin holder.

FIG. 7 shows a perspective view of an exemplary embodiment of the arrangement 35 consisting of insulation cover 30, pins 10, 11, 23 (not shown) and pin holder 34. The pin holder 34 is designed in such a way that the screws 27, which are provided for pressing the stranded wires inserted through the wire insertion openings into the feedthroughs 26 of the terminals 25 in at least one contact point against the corresponding pins 10, 11, 23 inserted into the feedthroughs 26 and thus providing the electrically conductive contact in a respective coupling portion 20, 21, 24, are accessible laterally (on the lateral surface of the arrangement 35) even when the arrangement 35 is assembled. Furthermore, in a state inserted into the cable plug connector 1, the pin holder 34 forms the coupling piece 2, which has the key elements 3' formed as lugs.

Figure 8:
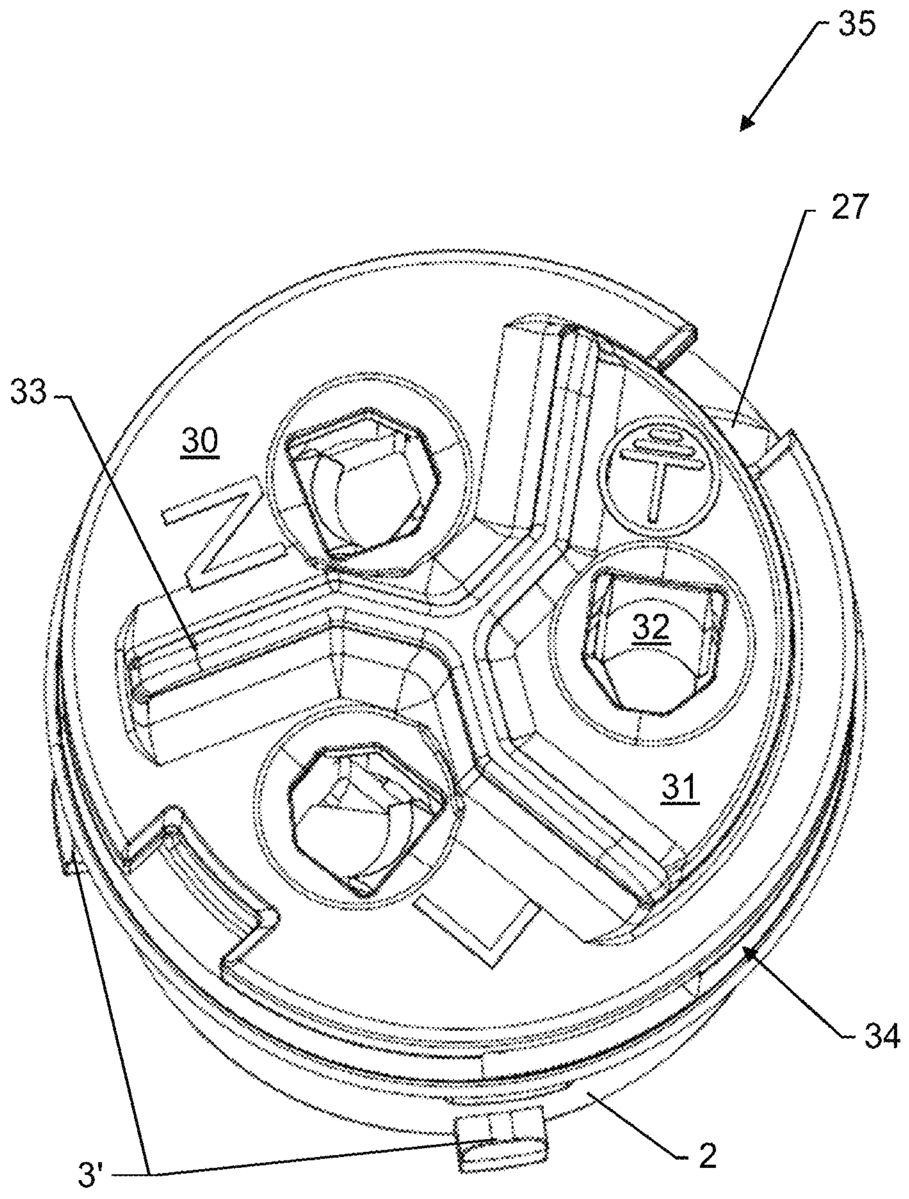
FIGS. 8-9: show different views of the arrangement from FIG. 7.
Figure 9:
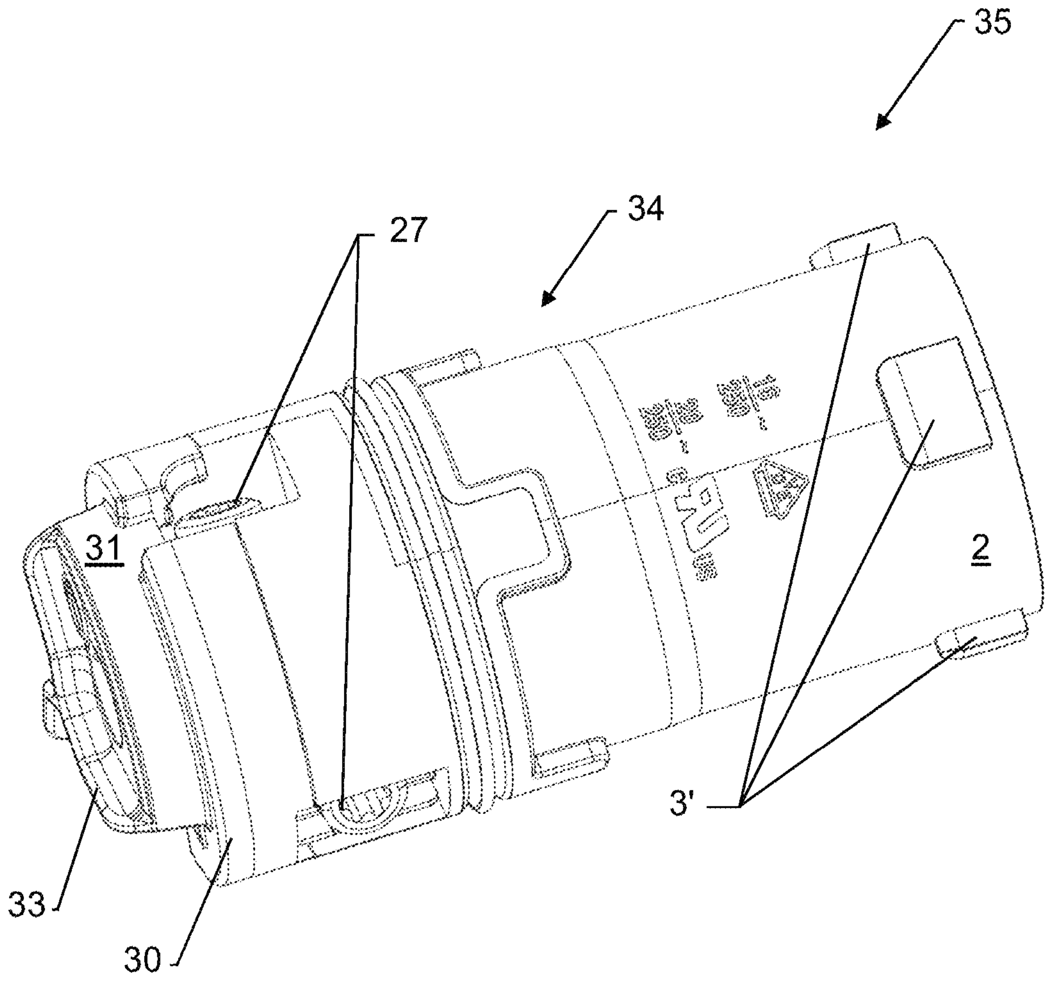

FIGS. 8 and 9 also show different views of the arrangement from FIG. 7 for further illustration.

Figure 10:
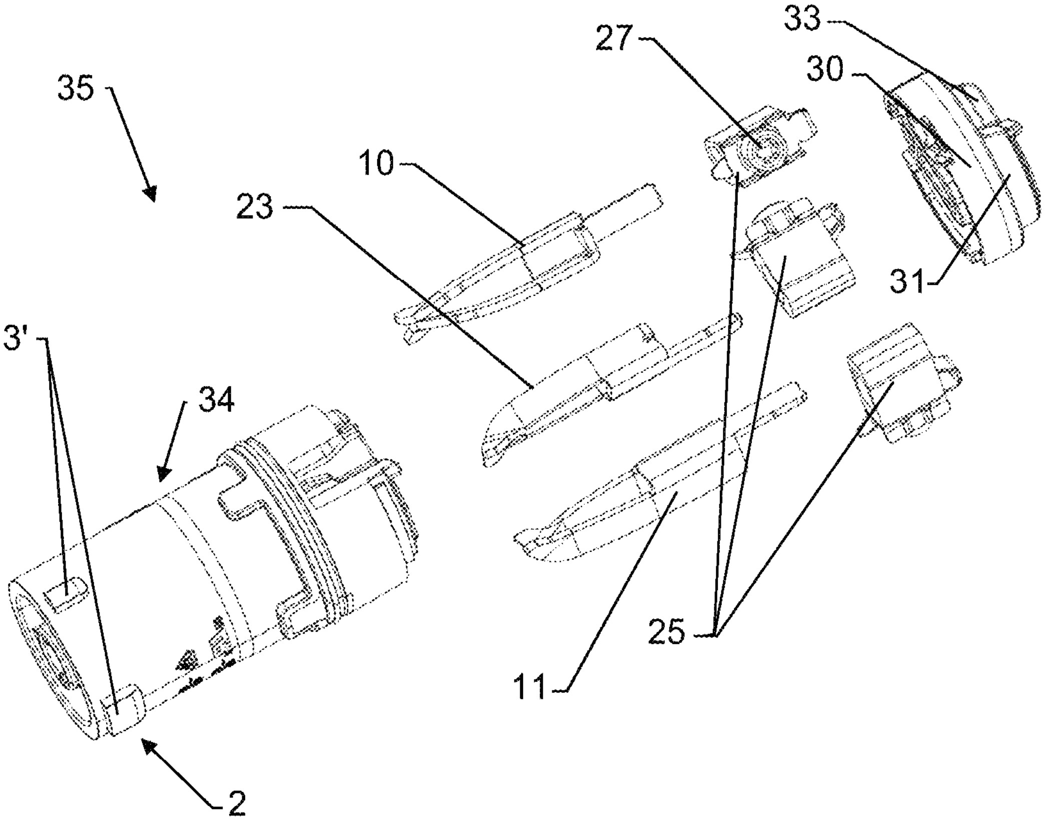
FIG. 10: shows an exploded view of an exemplary embodiment of the arrangement of insulation cover, pins and pin holder.

FIG. 10 shows an exploded view of an exemplary embodiment of the arrangement 35 consisting of insulation cover 30, pins 10, 11, 23 and pin holder 34.

Figure 11:
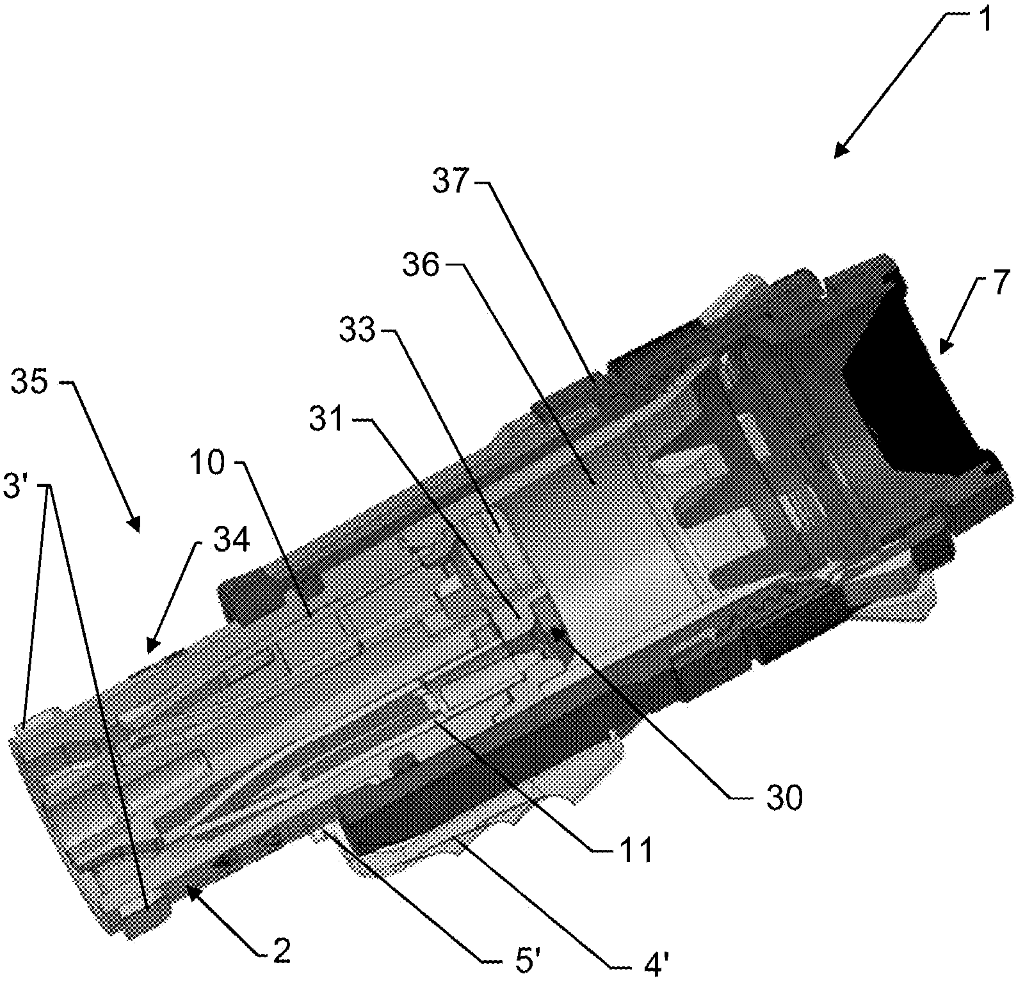
FIG. 11: shows a view of a cross-section through an exemplary embodiment of the cable plug connector according to the invention.

FIG. 11 shows a view of a cross-section through an exemplary embodiment of the cable plug connector 1 according to the invention, wherein the arrangement 35 is installed in the cable plug connector 1. In the embodiment shown, the cable plug connector 1 according to the invention has the clamping sleeve 36, which has an axial passage for the power cable extending parallel to or coaxially along the longitudinal axis of the cable plug connector 1, through which the power cable and, accordingly, the strands of the power cable can be inserted up to the insulation cover 30. As previously described, the stranded wires can then be pushed through the wire insertion openings of the insulation cover 30 corresponding to the wires, behind which the stranded wires can then be contacted with the pins 10, 11, 23 located in the pin holder 34 with the aid of the terminals 25. Once the strands are contacted with the pins, the position of the power cable in the cable plug connector 1 can be fixed by screwing the union nut 37 onto the housing of the cable plug connector 1, which presses the clamping sleeve against the cable and fixes it with respect to a movement coaxially along the longitudinal axis of the cable plug connector 1 in the direction of the cable insertion opening 7 contained in the union nut 37.

Figure 12:
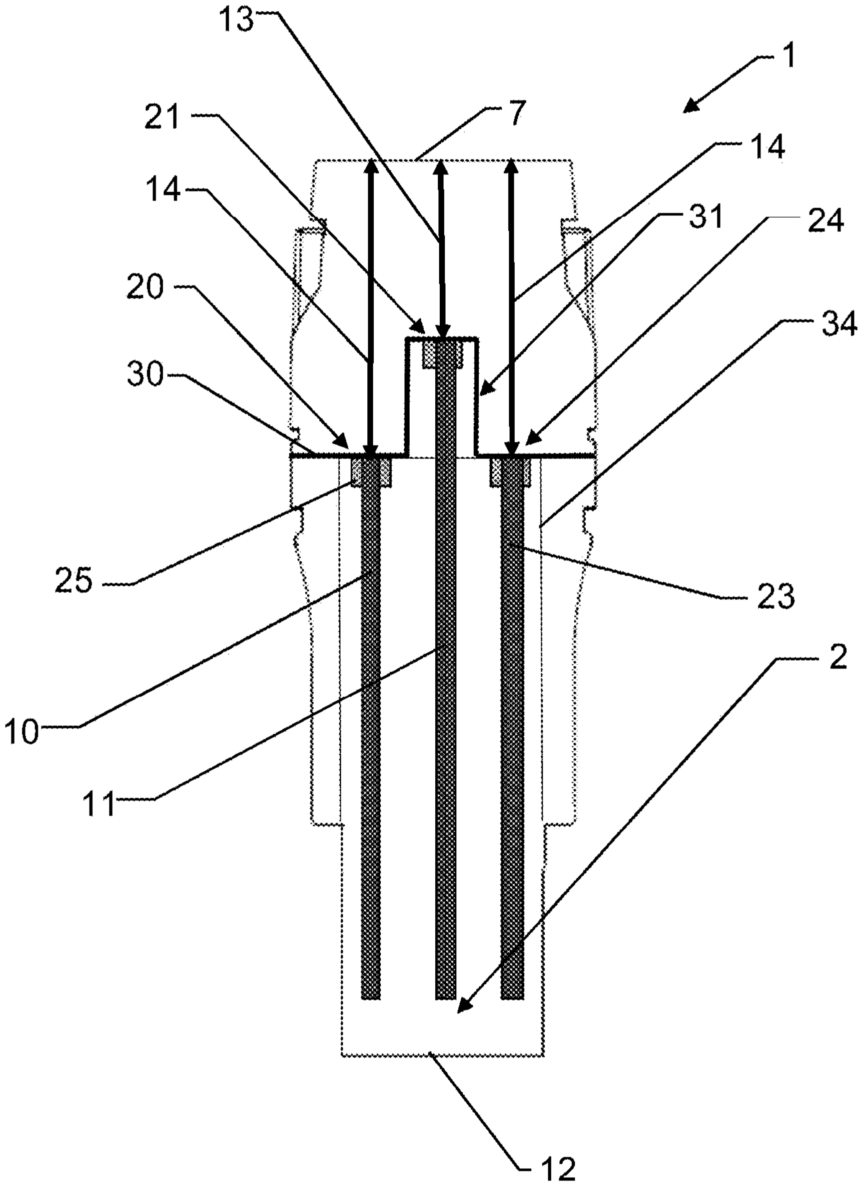
FIG. 12: shows a schematic representation of a cross-section of an exemplary embodiment of the cable plug connector according to the invention.

FIG. 12 shows a schematic representation of a cross-section of an exemplary embodiment of the cable plug connector 1 according to the invention. Through this cross-section, the three pins 10, 11, 23, which are arranged inside the cable plug connector, can be seen. These are each inserted into the pin holder 34 and separated from the upper part of the cable plug connector 1 (this part has, for example, the clamping sleeve 36, the union nut 37 and the cable insertion opening 7) by the insulation cover 30.

In the embodiment shown in FIG. 12, an earth pin 11 is used which has a greater overall length than the respective overall length of the outer conductor pin 10 and the neutral conductor pin 23, wherein at least the insulation cover 30 (for example by means of the elevation/recess 31) is designed in such a way that the earthing coupling portion 21 has a shorter distance 13 from the cable insertion opening 7 than the coupling portions 20, 24 of the other pins 10, 23 (represented by the longer distances 14).

Also as a result of the longer earth pin 11, despite the earthing coupling portion 21 being displaced in the direction of the cable insertion opening 7, the ends of the pins 10, 11, 23 which are to be contacted with corresponding mating pins in a panel connector are equally spaced from the coupling piece 2 or the outer end 12 of the coupling piece 2. This means that common panel connectors can still be used to provide the plug connection with the cable plug connector 1.

Figure 13A:
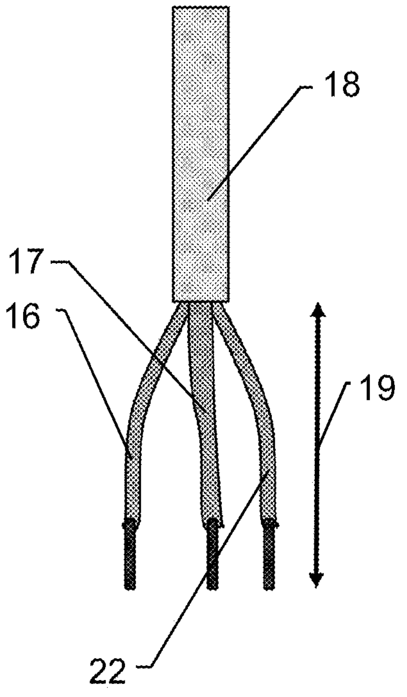
FIGS. 13A-13B: show a schematic representation of the electrically conductive connection of the pins with the cores of the power cable inserted into the cable insertion opening in a respective coupling portion.
Figure 13B:
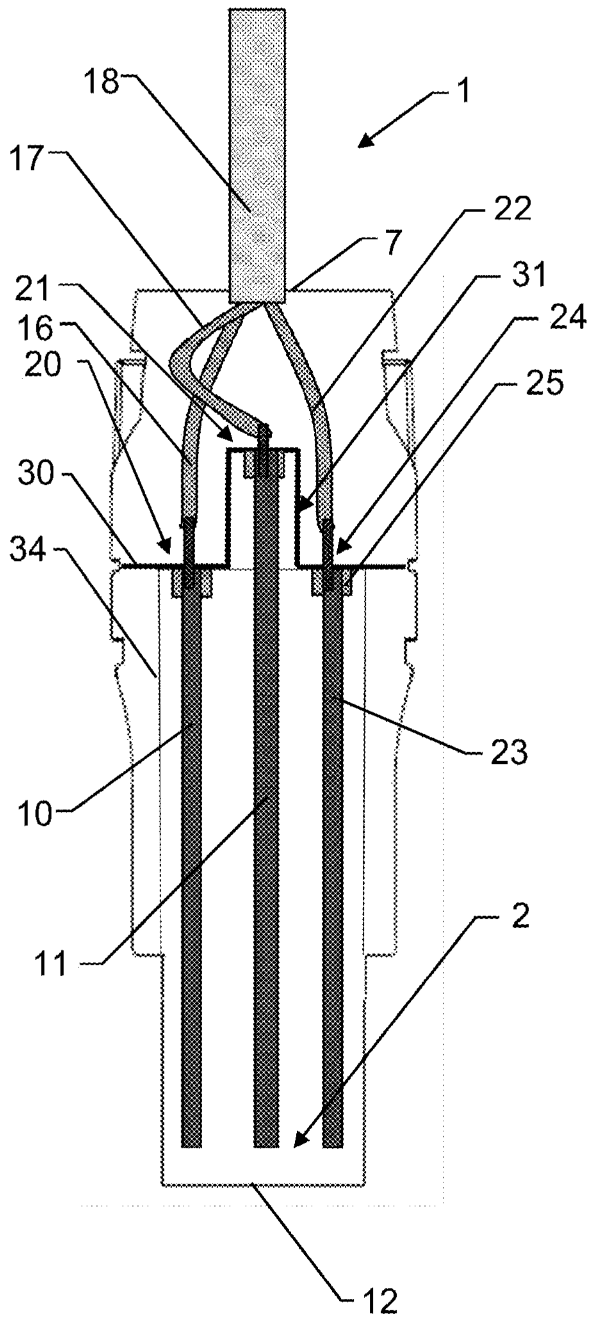

FIGS. 13A and 13B show a schematic representation of the electrically conductive connection of the pins 10, 11, 23 with the stranded wires of the outer conductor 16, neutral conductor 22 and protective conductor 17 of the power cable 18 inserted into the cable insertion opening 7, in the first coupling portion 20, the second coupling portion 24 and the earthing coupling portion 21.

FIG. 13A here shows the power cable 18, which has the three cores constituted by outer conductor 16, neutral conductor 22 and protective conductor 17, which have the same length 19 in their portions exposed by the cable sheath of the power cable 18.

In the exemplary embodiment of the cable plug connector 1 according to the invention shown in FIG. 13B, the earthing coupling portion 21 is displaced in the direction of the cable insertion opening 7 and thus has a smaller distance to the cable insertion opening 7 than the coupling portions 20, 24 of the further pins 10, 23. For this reason, when the stranded wires of the cores 16, 17, 22 with the same length 19 are connected to the ends of the pins 10, 11, 23 directed towards the cable insertion opening 7, a loop (or bend/curve/noose) is formed in the corresponding coupling portions 20, 21, 24 due to the earthing coupling portion 21 being closer to the cable insertion opening 7 quite automatically and without any further work steps (such as, for example, leaving the earth conductor 17 longer by cutting and stripping it differently from the other wires 16, 22). bend/curve/loop) in the earth conductor 17.

The loop formed in this way in the earth conductor 17 ensures that when the power cable 18 and thus also the respective cores 16, 17, 22 are pulled, the outer conductor 16 and the neutral conductor 22 are stretched more quickly (due to the shorter distance until these cores 16 are stretched) than the earth conductor 17, and the tensile stress occurring due to the pulling acts more quickly on the coupling portions 20, 24 than on the earthing coupling portion 21. In the case of the earth conductor 17, the loop/bend must first be stretched until the earth conductor is stretched, which is why a longer path is required for this.

Consequently, in the event of improper pulling/tearing on the power cable 18 and/or on the cable plug connector 1, the electrically conductive connection of the stripped part of the earth conductor 17 to the earth pin 11 in the corresponding earthing coupling portion 21 comes loose last, i.e. after the connections of outer conductor 16 and neutral conductor 22 to the corresponding pins 10, 23 in the further coupling portions 20, 24. Thus, the cable plug connector 1 remains permanently protected by the earthing 17.

It is understood that these figures only schematically illustrate possible exemplary embodiments. The different approaches can also be combined with each other and with prior art methods.

The invention claimed is:

1. A cable plug connector configured for establishing an accurately fitting mechanically lockable plug connection with a panel connector matched to the cable plug connector as a counterpart, the cable plug connector comprises:

a mechanical retaining element that is adapted to be blocked from axial movement in a cable plug connector extraction direction by a retaining element counterpart on the panel connector side as part of a first part of a locking mechanism operable by rotation of the cable plug connector in a screwing-in direction with the cable plug connector at least partially inserted into the panel connector, a latch slider, that is adapted to engage, as part of a second part of the locking mechanism, which can be actuated that is actuatable by displacing the latch slider, with a latch connected to the latch slider in a locking element on the panel connector side and thus to block the cable plug connector against rotation in an unscrewing direction, which is directed counter to the screwing-in direction, mechanical key elements that cooperate with matched key element counterparts of the panel connector such that the cable plug connector is insertable into the panel connector in only one specific rotational orientation predetermined by the key element counterparts, a cable insertion opening for inserting a power cable comprising three individual conductors, comprising an outer conductor, a neutral conductor and protective conductor, and an outer conductor contact element, a neutral conductor contact element and a protective conductor contact element, that are adapted to come into contact with a respective contact element counterpart on the panel connector side by establishment of the plug connection, wherein the outer conductor contact element is adapted to provide an electrically conductive connection with a conductor end piece of the outer conductor in a first coupling portion, the neutral conductor contact element is adapted to provide an electrically conductive connection with a conductor end piece of the neutral conductor in a second coupling portion, and the protective conductor contact element is adapted to provide an electrically conductive connection with a conductor end piece of the protective conductor in a third coupling portion, wherein the electrically conductive connections are each provided within the respective coupling portion via the respective conductor end piece of the individual conductor being contacted at at least one contact point and thereby fixed, an end of the third coupling portion that acts as an earthing coupling portion on a cable insertion opening side is arranged at a shorter distance from the cable insertion opening in an insertion direction of the power cable into the cable insertion opening than an end of the first coupling portion on the cable insertion opening side and an end of the second coupling portion on the cable insertion opening side.

2. The cable plug connector according to claim 1, further comprising a coupling piece that is insertable in an axial direction into an opening of the panel connector to establish the plug connection.

3. The cable plug connector according to claim 2, wherein the cable insertion opening is adapted to be arranged at an end of the cable plug connector opposite the coupling piece in the axial direction.

4. The cable plug connector according to claim 1, wherein the mechanical retaining element is moved by and upon actuation of the first part of the locking mechanism along an inclined path of the retaining element counterpart until the retaining element encounters a rotational stop provided in the panel connector and thus a final insertion position of the cable plug connector in the panel connector is reached, and is formed as a lug arrangement and the retaining element counterpart is formed as a groove arrangement, wherein grooves of the groove arrangement in an inserted state first extend axially and thereby serve as key counterparts for the lug arrangement, and then extend normal to an axis or slightly obliquely to normal to the axis, wherein a groove arrangement region extending normal or slightly obliquely to normal to the axis engages behind the lug arrangement as a result of establishment of the plug connection and the cable plug connector is thereby blocked against axial extraction, or is formed as a groove arrangement, wherein grooves of the groove arrangement first extend axially, and then extend normal to the axis or slightly oblique to normal to the axis, wherein the retaining element counterpart is formed as a lug arrangement which is inserted into the groove arrangement by the establishment of the plug connection and engages behind through a groove arrangement region extending normal or slightly oblique to normal to the axis, thereby blocking the cable plug connector against axial extraction.

5. The cable plug connector according to claim 1, wherein the protective conductor contact element has a greater overall length than at least one of the outer conductor contact element or the neutral conductor contact element.

6. The cable plug connector according to claim 1, further comprising three fixing elements, wherein the electrically conductive connections are each provided by one of the three fixing elements, the three fixing elements each comprise a terminal, the respective terminal has in each case an axial feedthrough, into which the respective current transfer contact element is insertable in an axial direction of the feedthrough and the respective conductor end piece of the individual conductor is insertable from a direction opposite to the axial direction of the feedthrough, and by realizing a clamping mechanism the respective conductor end piece of the individual conductor is contactable at the at least one contact point with the respective current transfer contact element, and the respective conductor end piece of the individual conductor and the respective current transfer contact element are fixed in the terminal by realizing the clamping mechanism.

7. The cable plug connector according to claim 6, further comprising an insulation element configured to spatially separate the three coupling portions from one another and to insulate them such that no electrically conductive connection can exist between the coupling portions.

8. The cable plug connector according to claim 7, wherein the insulation element has three recesses for receiving a respective one of the three fixing elements, and the three recesses are spaced apart from one another such that no electrically conductive connection can exist between the current transfer contact elements fixed in the respective terminal.

9. The cable plug connector according to claim 8, wherein one of the three recesses is configured to receive the fixing element provided for fixing the protective conductor contact element, forming a protective conductor contact element recess, an extent of the protective conductor contact element recess in the axial direction to the cable insertion opening extends 1 mm to 5 mm further than a respective extent in the axial direction to the cable insertion opening of the other two recesses.

10. The cable plug connector according to claim 2, wherein the coupling piece is configured, in interaction with a support skirt region of the panel connector in a state created by establishment of the plug connection, to provide a support effect for the cable plug connector with respect to loading forces acting on the cable plug connector perpendicular to the cable plug connector insertion direction.

* * * * *